United States Patent [19]

Butler

[11] Patent Number: 4,524,759
[45] Date of Patent: Jun. 25, 1985

[54] PROCESS FOR THE REVERSIBLE TRANSFER OF THERMAL ENERGY AND HEAT TRANSFER SYSTEM USEFUL THEREIN

[76] Inventor: Robert F. Butler, 18805 Orange Ave., Sonoma, Calif. 95476

[21] Appl. No.: 546,470

[22] Filed: Oct. 28, 1983

[51] Int. Cl.³ .......................... F24J 3/02; F25B 27/00
[52] U.S. Cl. .................................. 126/452; 126/437; 126/433; 62/235.1; 62/238.3; 62/476
[58] Field of Search .................... 62/260, 235.1, 238.3, 62/476, 481, 485; 165/104.12, 1, 10 R, 10 A, 104.11; 126/900, 400, 430, 436, 437, 452

[56] References Cited

U.S. PATENT DOCUMENTS

| | | | |
|---|---|---|---|
| 3,845,628 | 11/1974 | Bronicki | 60/656 |
| 3,972,183 | 7/1977 | Chubb | 126/433 |
| 4,146,013 | 3/1979 | Foulke | 126/900 |
| 4,154,292 | 5/1979 | Herrick | 126/400 |
| 4,199,952 | 4/1980 | Berg | 62/476 |
| 4,206,745 | 6/1980 | Gilgen | 261/128 |
| 4,278,073 | 7/1981 | Canzano | 126/900 |

Primary Examiner—Samuel Scott
Assistant Examiner—G. Anderson
Attorney, Agent, or Firm—Flehr, Hohbach, Test, Albritton & Herbert

[57] ABSTRACT

A process for reversibly transferring heat between a plurality of zones maintained at different temperature levels, and a heat transfer system useful therein. The technique involves maintaining a solution of a volatile material, e.g., a solution of a non-volatile inorganic salt in ammonia, in a solution tank, feeding the solution into an evaporator to evaporate the ammonia (or other volatile material), and feeding the ammonia vapor thus formed into a separate receiver which is in heat exchange relationship with a low temperature thermal sink, while recycling the solution having a decreased ammonia content to the solution tank. Heat is thus transferred to a low temperature thermal sink, and the procedure is continued to store any desired quantity of thermal energy therein. When it is desired to withdraw heat from the system, the salt/ammonia solution, containing a decreased concentration of the ammonia, is fed into a condenser wherein ammonia vapor is absorbed and additional vapor is introduced by vaporization of ammonia in the receiver, thereby transferring heat from the low temperature thermal sink to the useful temperature level of the condenser.

Thermal energy, which may be provided by solar insolation or other low grade heat sources, is thus transferred from the evaporator, stored in a low temperature thermal sink, and recovered from the condenser at useful temperatures. Use of a separate solution tank and receiver facilitates independent control of the instantaneous heat input and output in the evaporator and condenser, and the total thermal storage capacity in the receiver and thermal sink. Use of a working fluid incorporating a first, volatile material such as ammonia, and a second, relatively non-volatile material compatible therewith (such as sodium thiocyanate or other non-volatile inorganic salt) facilitates prolonged, efficient operation of the sequential thermal charging and discharge operations.

21 Claims, 9 Drawing Figures

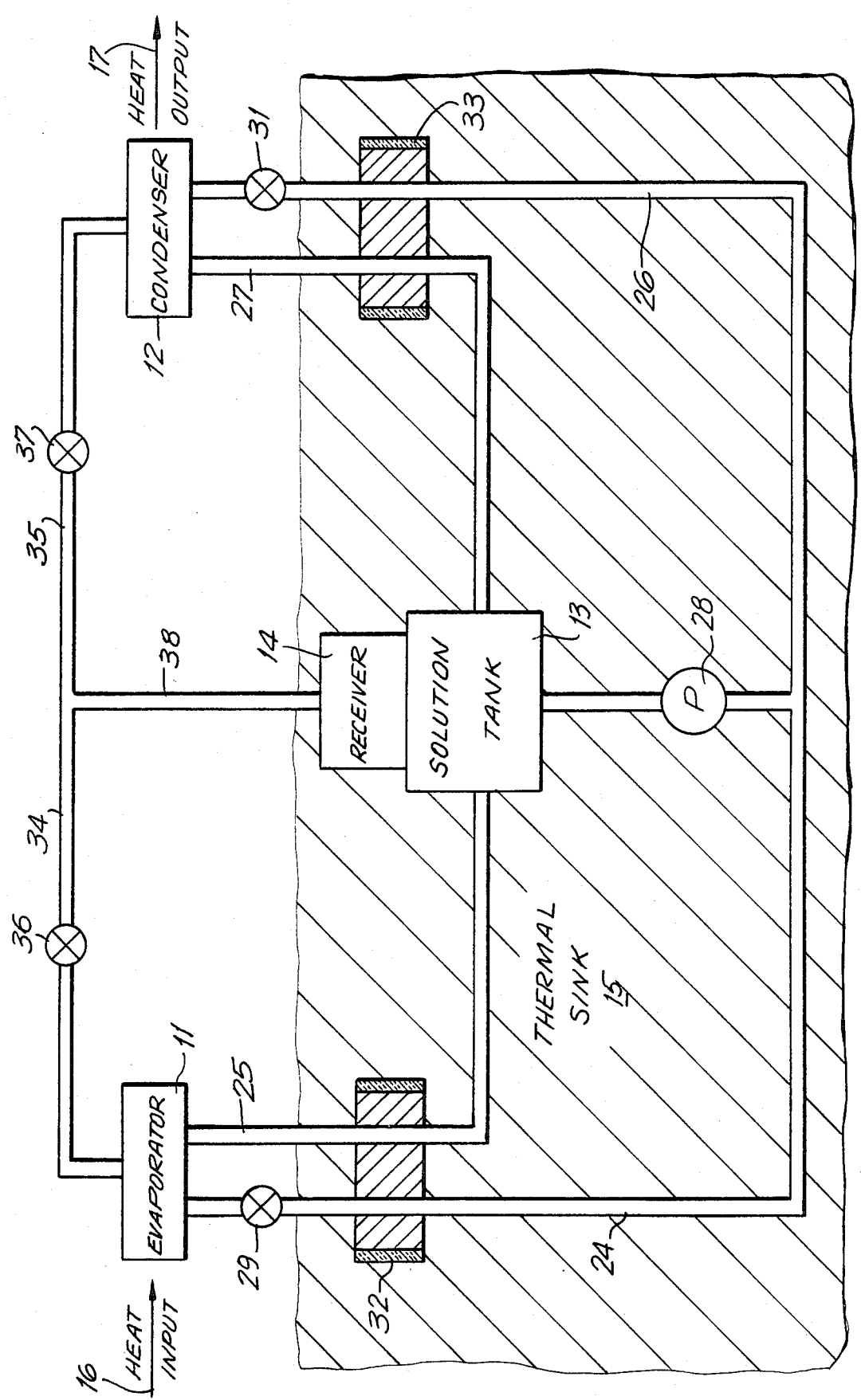

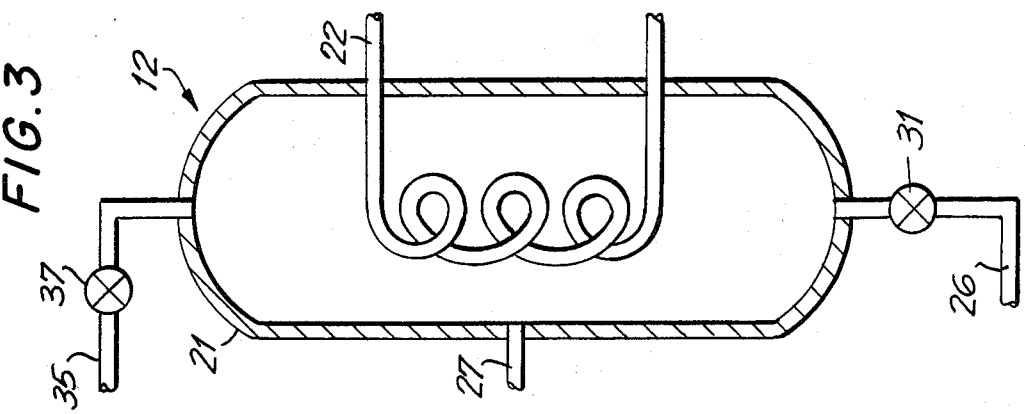
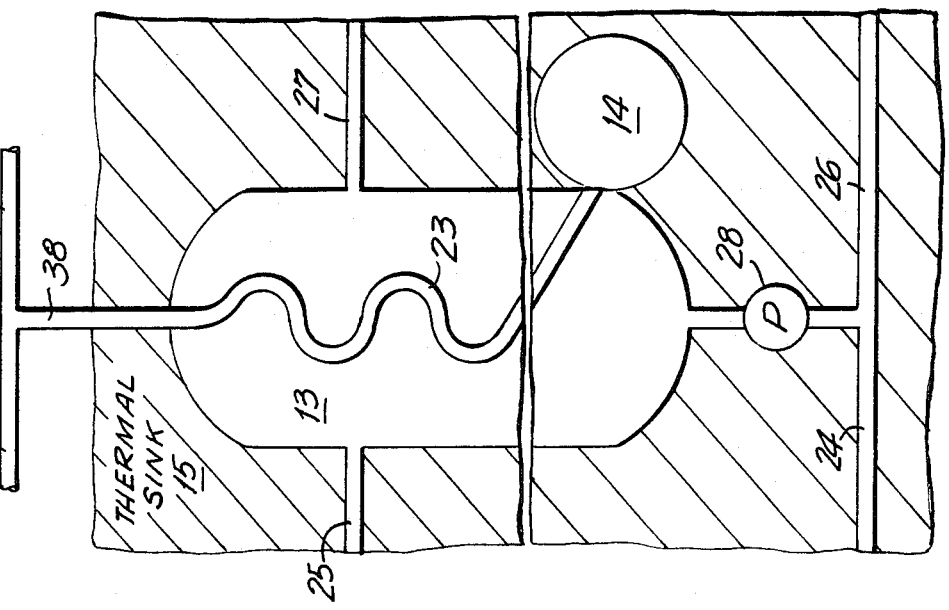
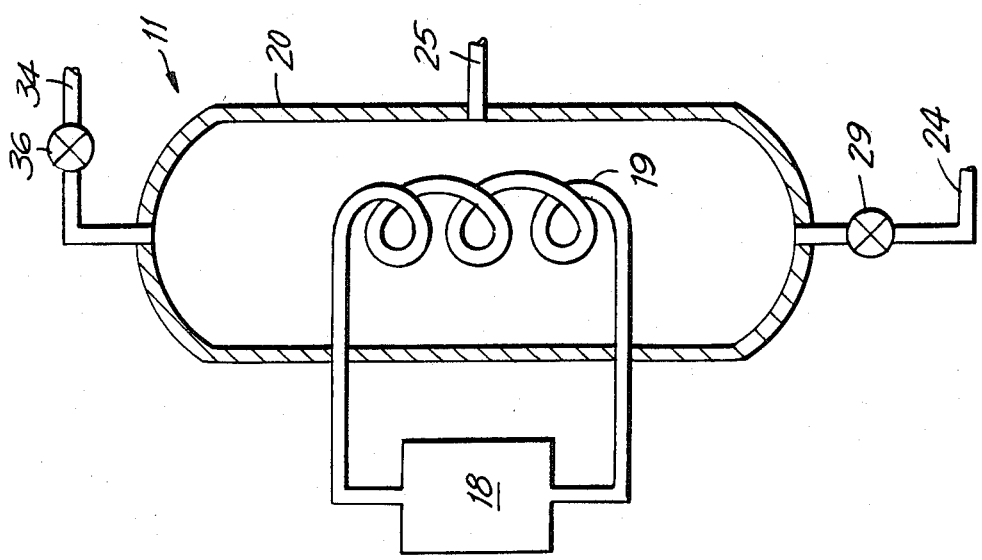

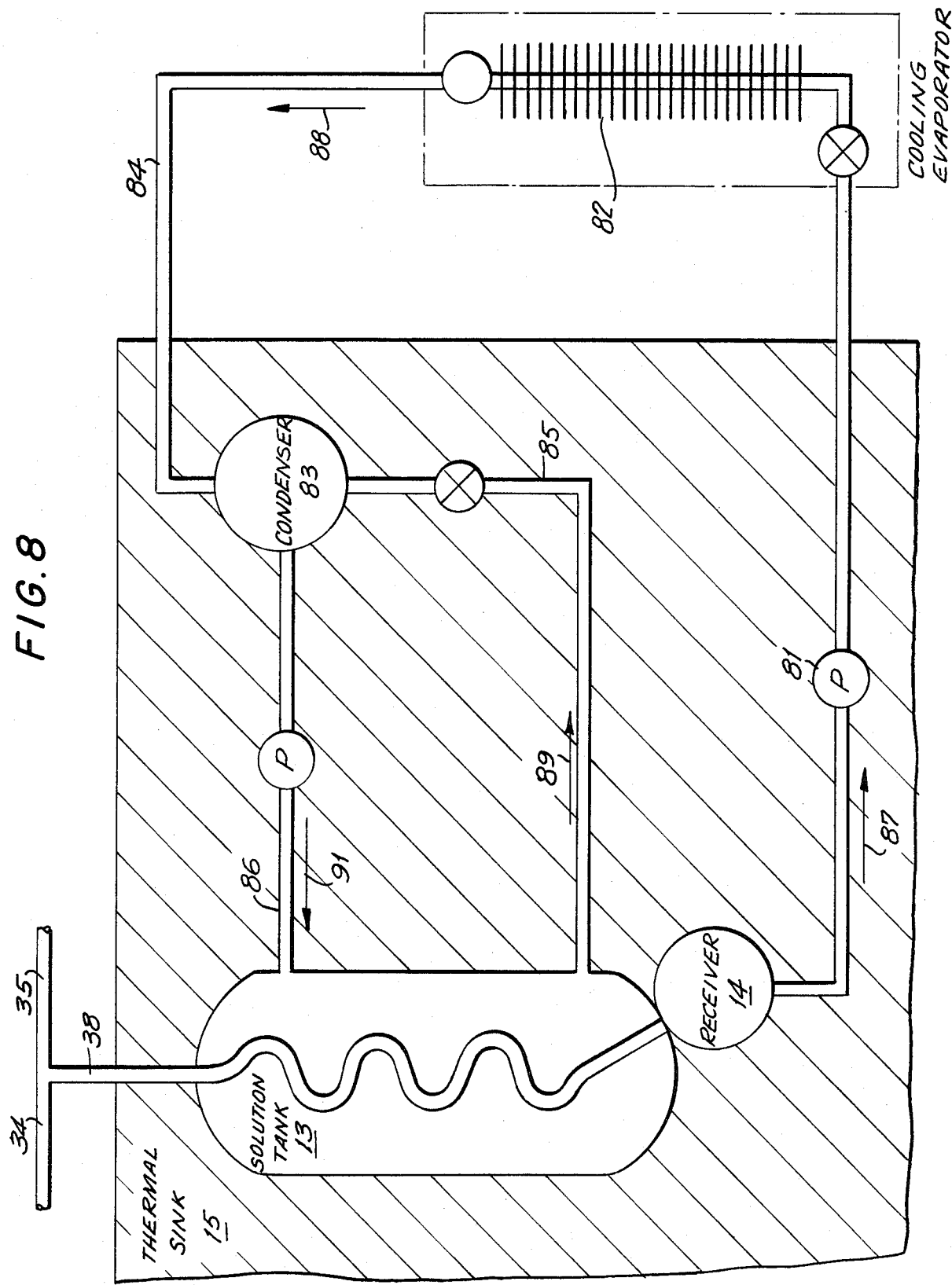

PROCESS FOR THE REVERSIBLE TRANSFER OF THERMAL ENERGY AND HEAT TRANSFER SYSTEM USEFUL THEREIN

BACKGROUND OF THE INVENTION

This invention relates to a process for reversibly transferring heat between two zones operating at different temperature levels, and more particularly to a heat pump technique actuated by solar insolation or other low grade heat sources, and to a heat transfer system useful therein.

Numerous techniques have been devised over the past several years for the transfer and/or storage of thermal energy obtained by means of solar collection. Such processes have incorporated chemical heat pumps utilizing thermal energy produced by dissociation reactions (see, e.g., Chubb U.S. Pat. No. 3,972,183), by the dilution of concentrated solutions (see, e.g., Foulke U.S. Pat. No. 4,146,013), by multiple phase changes (see, e.g., Herrick U.S. Pat. Nos. 4,152,899 and 4,154,292), by intermittent absorption cycles (see, e.g., Berg U.S. Pat. No. 4,199,952 and Gilgen U.S. Pat. No. 4,206,745), and the like. Various of these and other solar energy transfer, recovery and/or storage techniques have made use of the distinct thermal characteristics of multiple working fluids upon various phase changes (see, e.g., the above Herrick and Gilgen patents, Bronicki et al U.S. Pat. No. 3,845,628, and Canzano U.S. Pat. No. 4,278,073).

Other methods for the transfer, recovery and/or storage of thermal energy produced by solar insolation are described, for example, in U.S. Pat. Nos. 3,875,926; 4,050,445; 4,052,975; 4,131,158; 4,138,995; 4,182,409; 4,184,477; 4,237,964; 4,258,700; 4,267,825; 4,308,912; 4,341,202; 4,365,661; 4,366,853; 4,375,806; and 4,385,625.

Intermittent cycle chemical effect heat transfer systems have, in particular, been utilized for many years. Hence, prior to 1940 a number of refrigeration devices employing such cycles were commercially marketed, including the so-called "Icyball" unit. In that device a concentrated ammonia/water solution was heated in a "generator" chamber to vaporize the ammonia, the ammonia was cooled and condensed in a condenser chamber or "ball", and subsequently re-evaporated in the ball (with consequent refrigeration effect) and re-absorbed in the generator (see column 2, lines 3–40 of the above Berg U.S. Pat. No. 4,199,952).

Such intermittent cycle techniques have been employed in the conversion of solar energy, not only in the noted Berg patent, but in the above-noted Gilgen U.S. Pat. No. 4,206,745 as well. Gilgen describes a chemical heat pump in which a working fluid consisting of an ammonia/water solution is heated (e.g., by a solar heat source) within a tank to vaporize the ammonia, and the resulting vapor is bubbled into and absorbed by an ammonia/water solution in a second tank utilized as a lower temperature heat sink. Upon cooling of the first tank (e.g., at night) the vapor pressure of the ammonia/water solution therein decreases, creating a pressure differential which produces a vapor flow from the second tank into the first. The vapor is thereupon absorbed by and condensed in the solution in the first tank, the heat of condensation being given up to the solution (and being exchanged, for example, with an appropriate heat exchange medium for use for space heating or the like). The thermal energy of the ammonia vapor is thus transferred to a relatively low-temperature heat sink during the initial (day-time) charging cycle, and recovered during the subsequent (night-time) discharge cycle.

The Gilgen system requires the use of an impractical, immense insulated tank in which the ammonia/water solution is stored. Since both the heat input to, and the heat output from, the Gilgen chemical heat pump is effected by heat exchange with this tank, it is necessary that the tank have a volume sufficient to provide for both the instantaneous heat input and output requirements for the system, as well as a total heat storage capacity sufficient for any desired application. Where, for example, it is desired to utilize the Gilgen heat pump for the storage of approximately $1 \times 10^6$ B.T.U.'s, it is necessary to employ a pair of insulated tanks, each of which has about a 5,000 to 10,000 gallon capacity. Approximately 40% of the heat transferred by the Gilgen system is transferred by water vapor and is therefore non-recoverable and impedes effective storage. Thus, the Gilgen system is quite limited as to operational flexibility, and imposes substantial capital investment costs.

Moreover, use of the Gilgen heat pump is dependent upon maintaining relatively high differential concentrations of ammonia in the respective tanks (e.g., the formation of an 80% ammonia/20% water vapor mixture at 160° F. is illustrated). However, the concurrent entrainment of water and/or generation of water vapor results in gradual alteration of the required ammonia/water concentrations in the Gilgen tanks, resulting in eventual cessation of all heat transfer capability. When, for example, such a mixture is employed in a Gilgen-type system to meet a heat load of 150,000 B.T.U's per day, absent special techniques for decreasing water-vapor migration or re-establishing the original solution concentrations, the system will cease to function within less than 6 weeks of continual operation. Such a system is thus characterized by markedly impaired heating efficiencies.

BRIEF DESCRIPTION OF THE INVENTION

It is among the objects of this invention to provide a process for reversibly transferring heat between a plurality of zones at different temperature levels employing the intermittent heat cycle effect described in the Gilgen patent. The present process may, however (unlike the technique described by Gilgen), store substantial quantities of thermal energy compactly, and operate for unlimited periods without either replacement of the working fluid or decreased thermal efficiencies.

A further object of the invention is to provide a heat transfer system which has substantially reduced capital costs and requires only 10 to 15% of the space requirements of the Gilgen system, and which can efficiently repeat the reversible heat transfer cycle to provide substantial heat thru-puts over prolonged periods of time.

These and other objects and advantages are achieved employing a chemical heat pump cycle in which a solution of a volatile material is maintained in a solution-holding zone and circulated through evaporation and condensation zones. Volatile material vapor formed in the evaporation zone is fed into a separate receiving zone maintained at a low temperature level in heat exchange relation with a low temperature thermal sink having a heat capacity sufficient to provide the necessary heat storage for the desired application. Upon condensation of the vapor within the receiving zone, the latent heat of vaporization is transferred to the thermal sink. As it is desired to withdraw heat from the condensation zone, heat is transferred from the low temperature thermal sink to the receiving zone to vaporize the volatile condensate therein, and the resulting vapor flows into the condensation zone where it is absorbed by the solution. The heat of vaporization, as well as the heat of solution, thus released provides a useful heat output for space heating, for heating water, or for any processes or purposes which require moderate temperature heat sources.

By thus providing independent solution-holding and receiving zones in addition to the conventional evaporator and condenser zones of a chemical heat pump, the independent zone functions are separated. The solution-holding zone and receiver zone may be specifically designed to provide the requisite total heat storage capacity for any desired function, while the capacities of the evaporator and condenser zones may be separately chosen consistent with the instantaneous heat input and output requirements for the system. The evaporator and condenser need not have volumes sufficient to evaporate, store, and condense the entire working fluid, and may thus be designed for optimum flexibility and operating efficiency.

Taking the above example of a heat pump system designed to store about $1 \times 10^6$ B.T.U.'s, an adequate system may be provided in accordance with the present invention incorporating an evaporator and a condenser, each having a capacity of about 20 gallons, utilizing a receiver having a capacity of about 500 gallons, and a solution-holding tank having a capacity of about 1000 gallons. Moreover, whereas the evaporator/condenser tank of the Gilgen-type heat pump system must be insulated to avoid heat loss, the solution-holding tank of the present system need not be insulated but may rather be in direct heat exchange relation with the low temperature thermal sink. The sink thus provides the desired heat storage capacity, substantially decreases capital investment costs, and reduces space requirements.

In accordance with a further aspect of the invention, the solution employed as a working fluid in the heat transfer process hereof incorporates as the volatile material a substance having a high vapor pressure and a high heat of vaporization, and a second material which is relatively non-volatile and co-stable with the volatile material under the normal operating conditions of the process. Preferably, by utilizing as the working fluid a solution incorporating only one volatile material component, continued operation over periods measured in years is achieved. As indicated below, it is thus preferred to utilize a solution of a non-volatile inorganic salt, e.g., sodium thiocyanate, in ammonia as the working fluid, in lieu of the water/ammonia medium whose use is described in the Gilgen patent, for example. Even a water/ammonia solution may, however, be utilized if desired, in the heat transfer process and system of the present invention with no more than annual adjustment required.

BRIEF DESCRIPTION OF THE DRAWINGS

The novel features of the reversible heat storage and recovery process, and the heat transfer system, of the present invention may best be understood by reference to the following description, taken in connection with the accompanying drawings in which:

FIG. 1 is a schematic diagram of one preferred embodiment of the heat transfer system of the invention;

FIG. 2 is a schematic, detail drawing of the evaporator utilized in the system of FIG. 1;

FIG. 3 is a similar schematic, detail drawing of the condenser of the heat transfer system of FIG. 1.;

FIG. 4 is a schematic drawing showing the receiver and solution-holding tanks of the system of FIG. 1;

FIG. 8 is a schematic drawing of an alternative, air conditioning system embodiment of the present invention.

DESCRIPTION OF THE PREFERRED EMBODIMENTS

Figure 5A:
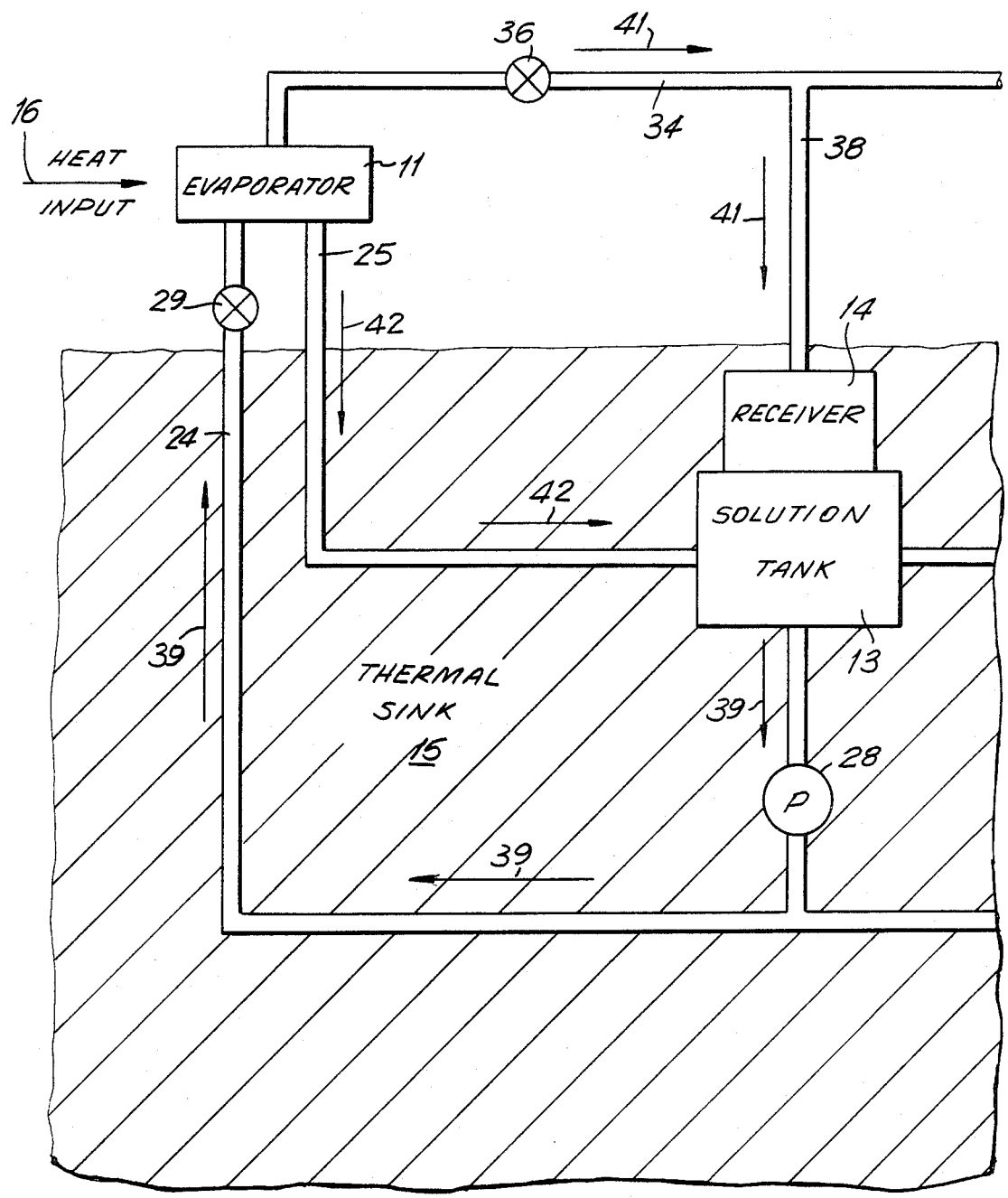
FIG. 5A is a partial schematic drawing of the system of FIG. 1, illustrating the fluid flows during the thermal charging cycle thereof.

Referring initially to FIGS. 1-4, a heat transfer system is illustrated, incorporating an evaporator 11 through which heat is charged to the system, and a condenser 12 from which a useful heat output is obtained. The heat transfer and storage is effected by means of a solution containing a volatile material, which is stored in a solution tank 13 communicating with both the evaporator 11 and the condenser 12. A receiver 14 also communicates with both the evaporator and the condenser, for receiving volatile material vapor from the evaporator and condensing the vapor, and for periodically vaporizing the condensate and feeding the resulting vapor into the condenser. The receiver 14 and, preferably but not necessarily, the solution tank 13 are in heat exchange relation with a low temperature thermal sink 15 which receives heat from the receiver upon condensation of the volatile material therein, and heats the condensate in the receiver to vaporize volatile material to be fed into the condenser.

As described more fully in connection with FIGS. 5A and 5B below, heat applied to the system at 16 (e.g., by solar insolation or from any other heat source, e.g., from a continuous low grade thermal exhaust from an industrial process) is utilized in the system-charging cycle to evaporate volatile material from the solution fed into the evaporator 11 from solution tank 13. The volatile material thus generated is fed into receiver 14 in which it is condensed, the sensible heat and heat of vaporization thereby released being transferred to the low temperature thermal sink 15. In the system discharge cycle, when it is desired to recover thermal energy from condenser 12, the solution is flowed through the condenser. Volatile material is absorbed therein, the decreased vapor pressure in the condenser drawing additional volatile material vapor into the condenser from receiver 14. Heat thus removed from the thermal sink 15 (by evaporation of the condensate within receiver 14) is given off through condenser 12 (by the release of the heat of solution and the heat of vaporization), producing a useful heat output 17. The solar insolation or other heat input 16 may be thus converted to a useful heat output 17 for any desired application, at a time and/or place more convenient than afforded by the source.

As indicated hereinabove, the solution comprises one or more substances having a high vapor pressure and a high heat of vaporization, in solution with one or more materials which are relatively non-volatile and are co-stable with the volatile material component under the normal operating conditions of the heat transfer process (i.e., within the range of from about 30° F. or less to 250° F. or more). The solution thus comprises a pair of components (each of which may be a single material or a mixture of materials), which have a high relative volatility ratio (i.e., one has a high vapor pressure and is thus volatile, and the other has a substantially lower vapor pressure and is thus relatively non-volatile), high mutual affinity, and which are stable in each other's presence. A material having a high latent heat of vaporization is chosen for the volatile material component, in order to insure efficient heat transfer and storage. Finally, the solution must have a low viscosity and be non-corrosive to standard construction materials.

Consistent with the preceding criteria, it is preferred to employ a solution of sodium thiocyanate in ammonia as the volatile material-containing solution utilized in accordance with this invention. The use of ammonia as the volatile material component is particularly preferred, both because of its high volatility, high heat of vaporization (550 B.T.U per pound), and other characteristics. When ammonia is thus utilized, non-volatile inorganic metal salts other than sodium thiocyanate, which are soluble in and stable with ammonia, e.g., other alkali metal halides, thiocyanates, or the like, may be utilized as the non-volatile component of the solution.

Alternatively, while use of the ammonia/salt solutions is preferred, it is intended that other binary, volatile material/relatively non-volatile material containing solutions may, less preferably, be employed in the practice of the method and apparatus hereof, including those mixtures incorporating ammonia in admixture with other, relatively non-volatile solvents, e.g., ammonia/water, ammonia/tetraethylene glycol, ammonia/2,3-butanediol and ammonia/1,4-butanediol. As used herein, reference to the presence of a volatile material (e.g., ammonia) and a relatively non-volatile material (e.g., water) in the working fluid utilized in the practice of the invention is intended to refer to those components having vapor pressures differing by several orders of magnitude under the system operating conditions.

In the following specification, principal reference is made to the use of the preferred sodium thiocyanate/ammonia working fluid in the embodiments of the invention described. It will, however, be understood that other working fluids exhibiting the characteristics described above may, alternatively, be utilized in the heat transfer process and system hereof.

Referring now to FIG. 2, the evaporator 11 is heated, either directly as by solar radiation, electrical conduction, or the like, or indirectly by an appropriate heat transfer medium such as water, ethylene glycol, etc. In the latter case, when solar insolation is employed as the source of thermal energy, the heat transfer medium may pass through conduits in a solar collector panel 18 and into heat exchange relation with evaporator 11 through a conduit 19 extending into the interior (or alternatively, about the periphery) of the evaporation zone within evaporator 11. The solar collector may, for example, be of the design described in my co-pending application Ser. No. 521,923 filed on Aug. 10, 1983 (2096-4). Alternatively, any conventional solar collectors may be utilized to effect heating of the solution containing the volatile material within evaporator 11.

The evaporator is suitably insulated (as shown at 20) from its surroundings, to avoid heat loss. The evaporator may otherwise be of any conventional design for promoting vaporization of the volatile material from the solution.

Condenser 12 (FIG. 3) is also externally insulated (as shown at 21), and may be provided of any conventional design for promoting rapid absorption of vapor in the solution therein. Suitably, an appropriate heat exchange coil 22 or similar heat exchange element is provided for feeding an appropriate heat transfer medium in heat exchange relation with the solution condensed within condenser 12. The heat of solution and heat of vaporization released within the condenser is thus transferred to the heat exchange medium, and is removed through coil 22 for space heating or other application. In some applications the heat released in the condenser may be used directly.

As shown in FIG. 4, the receiver 14 is in heat exchange relation with thermal sink 15. Solution tank 13, on the other hand, may be separated from both the receiver and the thermal sink and otherwise disposed in any convenient location. Preferably however, as shown, the receiver is mounted to the solution tank 13 with condenser coil 23 leading to the receiver extending through the solution tank, and both the solution tank and the receiver being in heat exchange relation with the thermal sink.

Thermal sink 15 provides an infinite, low temperature reservoir for heat released by condensation of ammonia vapor within condensing coil 23 and receiver 14. The thermal sink may suitably be maintained at temperatures varying from about 30° to 80° F. Such temperatures may be provided by burying the solution tank and receiver in damp earth; alternatively, the low temperature thermal sink may be provided by submerging the solution tank and receiver in a large body of water, encasing the solution tank and receiver within a vessel through which water is continuously circulated (whether by gravity feed or positive pump pressure), or by effecting heat exchange with other media exhibiting high thermal conductivity and mass.

An evaporator liquid inlet line 24 and an evaporator liquid outlet line 25 extend from solution tank 13 to evaporator 11. Solution is fed into the evaporator where ammonia is removed by evaporation, returning a solution relatively depleted in the ammonia to the solution tank 13.

In like manner, a condenser liquid inlet line 26 and a condenser liquid outlet line 27 extend from solution tank 13 to condenser 12. Solution is fed through line 26 into the condenser, where ammonia is absorbed, returning a solution relatively enriched in ammonia through outlet line 27 to solution tank 13. A pump 28 is provided for pumping the sodium thiocyanate/ammonia solutions through lines 24 and 26 into evaporator 11 and condenser 12, respectively. Valves 29 and 31 are also provided in the liquid inlet lines to facilitate control of the flow of the solution into the evaporator or the condenser, respectively.

The evaporator liquid inlet and outlet lines 24 and 25 are in heat exchange relation with one another, but are otherwise insulated from their surroundings, as indicated at 32 (FIG. 1). In like manner, the condenser liquid inlet and outlet lines 26 and 27 are thermally connected to one another but insulated from their surroundings, as indicated at 33. By thus thermally connecting the evaporator and condenser inlet and outlet lines while insulating them from their surroundings, sensible heat is recovered from the solution removed from the evaporator through line 25 and added to the solution fed into the evaporator through line 24; and recovered from the solution removed from the condenser through line 27 and added to the solution fed to the condenser through line 26. At the same time, heat loss to the surroundings is minimized.

An evaporator vapor outlet line 34 is additionally provided, extending from evaporator 11 to the receiver 14, for feeding ammonia vapor produced in the evaporator into the receiver. Similarly, a condenser vapor inlet line 35 extends from the receiver to condenser 12 for feeding ammonia vapor generated in the receiver to the condenser. Valves 36 and 37 are provided in the evaporator vapor outlet and condenser vapor inlet lines, respectively, to control the desired flow from the evaporator, and to the condenser. Lines 34 and 35 are suitably insulated from their surroundings, other than that portion of their common branch 38 which forms condenser coil 23 extending through and in heat exchange relation with solution tank 13. Heat transfer other than in the receiver, the solution tank, and the condenser is thereby minimized.

In operation, charging of the heat transfer system (FIG. 5A) occurs when the temperature of evaporator 11 produces ammonia at a pressure greater than that extant in the receiver. Valves 29 and 36 are opened, and pump 28 is actuated, to feed the sodium thiocyanate/ammonia solution from the solution tank 13 into evaporator 11, and allow ammonia vapor flow from the evaporator 11 to the receiver 14. As indicated by arrows 39, the sodium thiocyanate/ammonia solution is pumped through the evaporator liquid inlet line 24 into the evaporator. The solution is heated within the evaporator by heat exchange with the medium passed through solar collector 18 and heating coils 19 of FIG. 2. The solution is heated in the evaporator to temperatures ranging from about 80° F. or less to 250° F. or more, depending, for example, upon the nature of the heat source and/or ultimate use.

An ammonia vapor stream, indicated at 41, is thus generated and flows past valve 36 through the evaporator vapor outlet line 34 to receiver 14. Upon removal of the ammonia vapor stream, a sodium thiocyanate/ammonia stream having a decreased ammonia content is recirculated, as indicated by arrows 42, to solution tank 13.

The solution tank 13 and receiver 14 are in thermal equilibrium with the low temperature thermal sink 15, and are thus maintained at a temperature substantially lower than that of the evaporator 11, preferably from about 35° to about 45° F. when the thermal sink comprises damp earth, and from about 30° F. to about 80° F. when water is used as the sink. The ammonia vapor fed into receiver 14 is thus cooled and condensed therein, the sensible heat and heat of vaporization being transferred to the thermal sink. Prolonged charging results in a solution containing about 30-35% ammonia by weight, depending upon the evaporator and receiver temperatures.

Figure 5B:
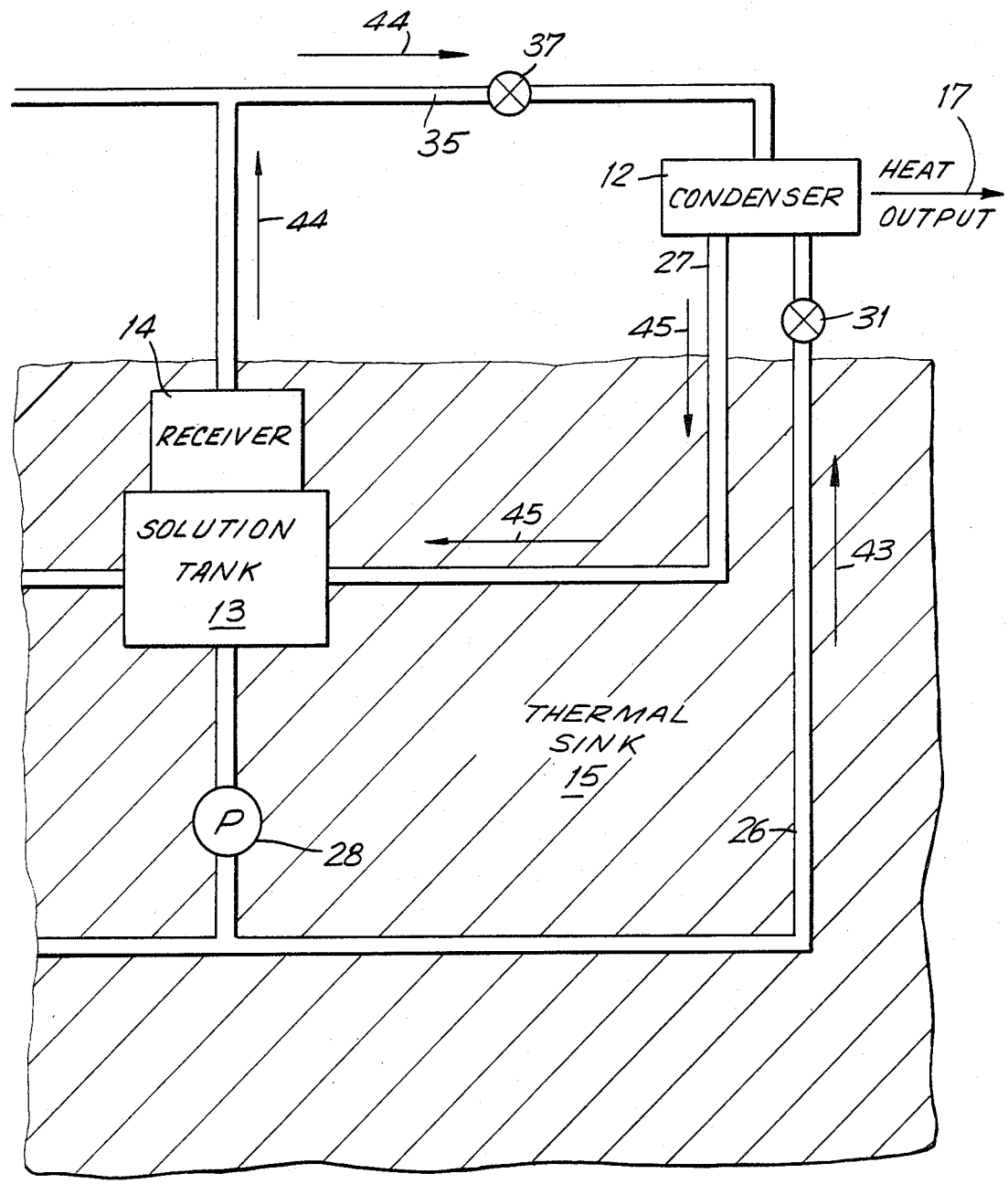
FIG. 5B is a similar partial, schematic drawing of the system of FIG. 1, illustrating the fluid flows during the thermal discharge cycle.

The discharge cycle of the heat transfer system is shown in FIG. 5B. As illustrated, when it is desired to remove heat from the condenser, valves 31 and 37 are opened to permit flow of the sodium thiocyanate/ammonia solution from solution tank 13 into condenser 12, and flow of ammonia vapor from receiver 14 to the condenser. The solution is thus fed from solution tank 13 through the condenser liquid inlet line 26, as indicated by arrow 43, into condenser 12. The solution fed to the condenser, having a reduced concentration of dissolved ammonia, absorbs ammonia vapor present in the condenser, thus tending to reduce the ammonia vapor pressure in the condenser. The differential pressure thus induced between the vapor pressure in the receiver and that in the condenser results in a flow of ammonia vapor from the receiver to the condenser, as indicated by arrows 44, to equalize the pressure in the two vessels. The solution containing the absorbed ammonia, thus having an increased ammonia content, is recycled to solution tank 13 through condenser liquid outlet line 27, as indicated by arrows 45. Prolonged discharge results in a solution containing about 50-55% ammonia by weight, depending upon the condenser and receiver temperatures.

The ammonia vapor condensed in condenser 12 is thus replaced by ammonia evaporated in receiver 14. The heat of vaporization required to evaporate that ammonia is extracted from the low temperature thermal sink. This thermal energy is released in the condenser to provide the desired heat output 17 from the system. Thus, in the embodiment illustrated the thermal energy obtained at a relatively high temperature level (from about 80° F. or less to 250° F. or more) by solar insolation is stored at a relatively low temperature (from about 30° to 80° F.), and then reversibly recovered at a yet higher temperature level (from about 80° F. or less to 120° F. or more).

The sodium thiocyanate/ammonia solution is introduced into evaporator 11 and condenser 12, either manually or automatically. In the former case, flow of the solution through lines 24, 25 and 34 and/or 26, 27 and 35 is effected by pump 28 and regulated by valves 29, 31, 36, and 37. The flow is so regulated as to provide continuous or periodic flow of the working fluid through the evaporator, receiver and condenser circuits for optimum heat transfer, storage and recovery. It should be noted that both charging and discharging can occur either sequentially or simultaneously with any excess heat charged being stored or any net heat discharged reducing the amount of heat in storage.

Alternatively, the charging and discharge cycles may be automatically initiated, employing an intermittent flow system which maintains the solution level constant in evaporator 11 and controls the solution flows by solution densities, temperatures and/or the effective temperature of the heat input 16. One preferred arrangement for carrying out such an intermittent flow technique employing pressure generated by the heat source to power the system, is illustrated in FIG. 6.

Figure 6:
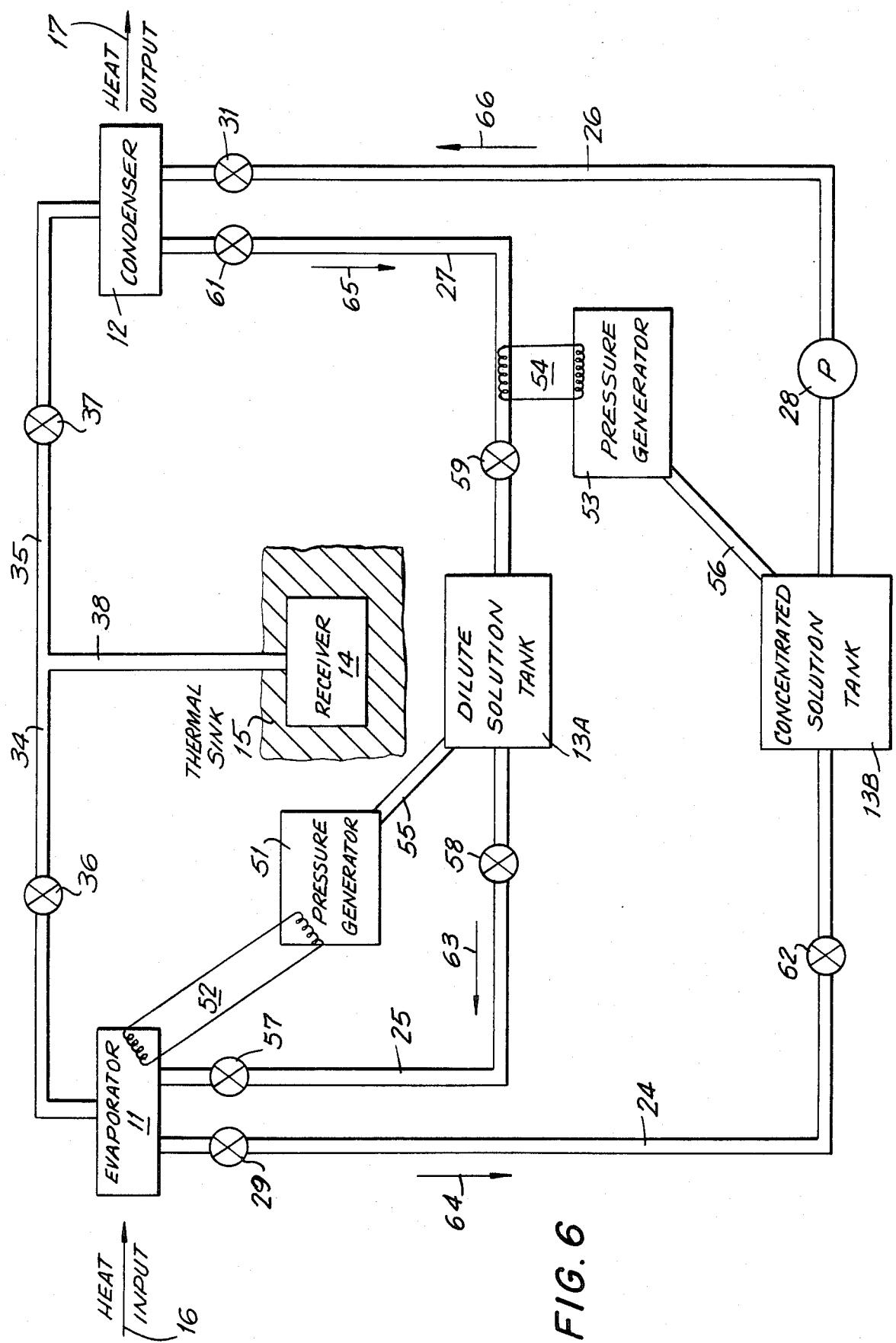
FIG. 6 is a schematic drawing of an alternative form of the heat transfer system of FIG. 1, utilizing a two-tank solution storage arrangement, to automatically initiate fluid flows.

The FIG. 6 embodiment is similar to the system of FIG. 1, but incorporates a pair of solution tanks, a dilute (ammonia-rich) solution tank 13A and a concentrated (ammonia-depleted) solution tank 13B, the solution flows to which are regulated by the thermal flows in evaporator 11 and condenser 12. Thus, a pressure generator 51 is thermally coupled by a suitable heat exchanger 52 to evaporator 11, and a pressure generator 53 is similarly coupled by a suitable heat exchanger 54 to the condenser outlet liquid line 27. The pressure generators contain low boiling temperature liquids fed through conduits 55 and 56 to the dilute solution tank 13A and concentrated solution tank 13B, respectively. Conduits 55 and 56 may terminate in pressure-applying bladder or diaphragm arrangements within the solution tanks, or may communicate directly with the interior of the solution tanks when a pressure generating liquid whose vapor is insoluble in, e.g., the sodium thiocyanate/ammonia working fluid, is employed.

Valves 57, 58 59, 61 and 62 are additionally provided in the dilute and concentrated solution tank circuits to facilitate automatic flows through the system, as described below.

In operation, when solar insolation or other heat input 16 is applied to evaporator 11, heat transferred to pressure generator 51 through heat exchanger 52 vaporizes the low boiling pressure generating fluid in the pressure generator, the resulting vapor flowing to dilute solution tank 13A and increasing the pressure therein. The ammonia-rich working fluid in tank 13A is fed by the increased pressure into evaporator 11, as indicated by arrow 63. Flow of the solution is controlled by valve 57 to maintain the desired quantity of the working fluid in the evaporator.

When the ammonia concentration in evaporator 11 decreases to a predetermined value (as measured by density, temperature or other means) valve 29 is opened, permitting flow of the ammonia-depleted solution (i.e., having a greater salt concentration resulting from the evaporation of ammonia therefrom) to the concentrated solution tank 13B, as indicated by arrow 64. The concentrated solution tank thus contains the working fluid at any predetermined, decreased ammonia concentration, for use in the discharge cycle.

The condenser 12 is only employed when the solar insolation or other heat input 16 is insufficient to operate evaporator 11. When valve 61 is actuated, the flow of warm, dilute (ammonia-rich) solution from the condenser through condenser output liquid line 27 heats the pressure generating liquid in pressure generator 53. Upon vaporization of such material, it flows through line 56 to the concentrated solution tank 13B, forcing the concentrated (ammonia-depleted) solution through condenser liquid inlet line 26, as indicated by arrow 66, to initiate the thermal discharge cycle. Valves 61 and 31 are utilized to maintain the desired quantity of solution in the condenser, such that only working solution diluted with ammonia to a predetermined extent is permitted to return to the dilute solution tank 13A.

The intermittent flow system illustrated in FIG. 6 thus provides a technique by which thermal exchange from the evaporation and condensation zones is utilized to initiate flows of the varying concentration sodium thiocyanate/ammonia working solution into evaporator 11 and condenser 12 to initiate the thermal charging and discharge cycles, respectively.

Figure 7:
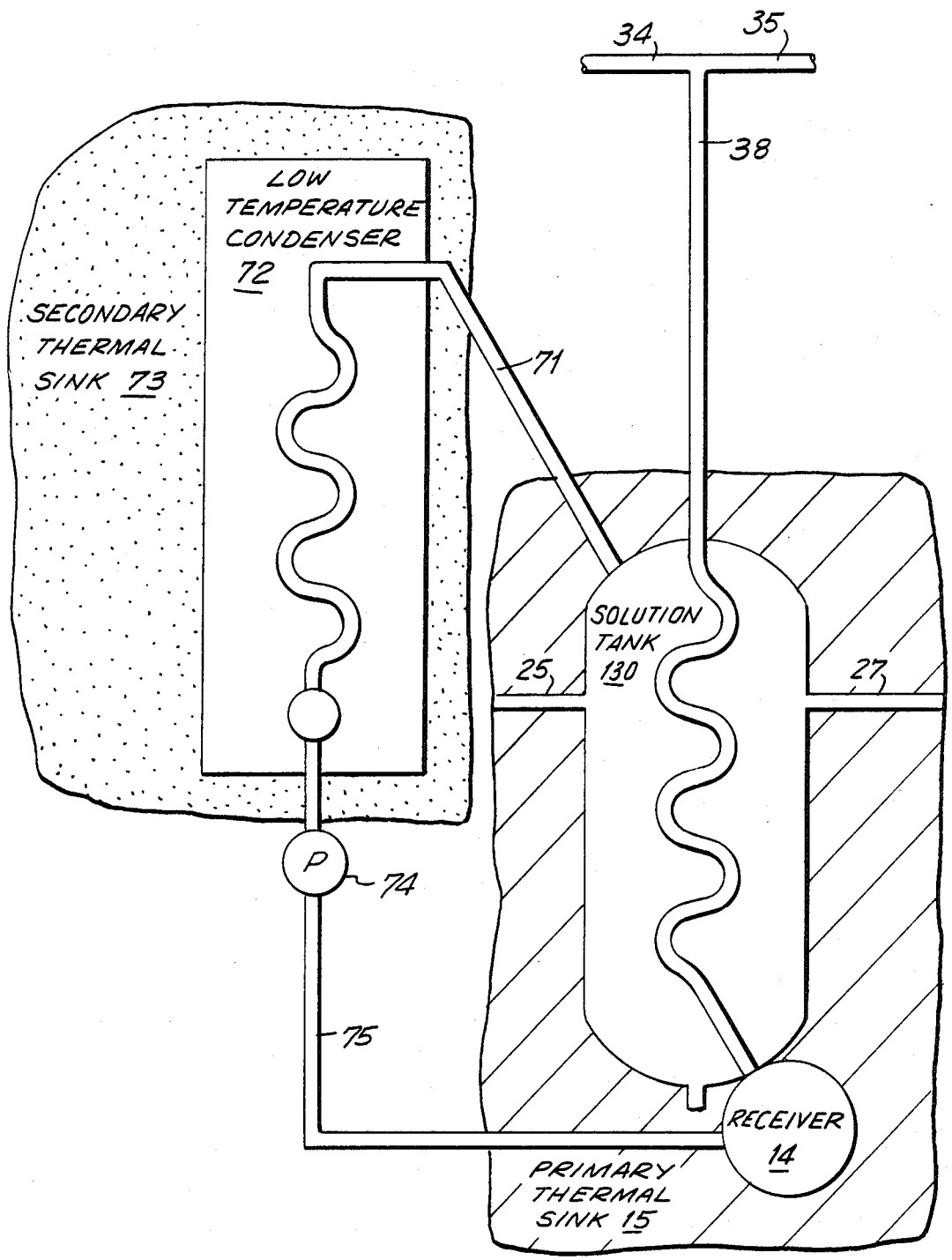
FIG. 7 is a schematic detail drawing of an alternative, low temperature condensing arrangement which may be utilized in frigid climates in conjunction with the heat transfer system of FIG. 1.

An alternative embodiment of the heat transfer system of the invention is illustrated in FIG. 7. This embodiment is particularly applicable in frigid environments in which an extremely cold secondary thermal sink (e.g., at temperatures of from about 5° down to as low as −60° F.) may be utilized to enhance condensation of the ammonia or other volatile material in the system working fluid.

As shown in FIG. 7, the solution tank 130 is connected, through solution vapor outlet line 71, to a low temperature condenser 72. Condenser 72 is in heat exchange relation with a secondary thermal sink 73, which may comprise cold ambient air or the like. Ammonia condensed in the low temperature condenser is pumped by pump 74 through liquid outlet line 75, into receiver 14.

In operation, ammonia within the low temperature condenser 72 is condensed at the extremely low temperatures prevailing therein, thus reducing the ammonia vapor pressure in the low temperature condenser and in solution tank 130 communicating therewith. The reduced pressure effects evaporation of ammonia within the solution tank, thereby removing heat from the solution and decreasing the ammonia concentration therein. So long as the primary thermal sink 15 has sufficient mass and thermal conductivity, the temperature of the solution within solution tank 130 remains constant.

Ammonia thereby condensed within low temperature condenser 72 is thereafter pumped by pump 74 into receiver 14. Use of the secondary thermal sink thus increases the amount of ammonia in receiver 14 and reduces the ammonia in the solution, thereby effecting thermal storage and potential recovery of heat from the primary thermal sink.

It will further be noted that the low temperature condensing system described may be utilized to provide thermal output in arctic or other frigid regions, whether or not the high temperature evaporator 11 is employed in conjunction therewith. The separate utility of the low temperature condensation system depends entirely on maintaining a sufficient increment between the temperatures of the primary and secondary thermal sinks (e.g., about 40° F. or more), and providing a primary sink having an adequate thermal mass.

Another embodiment of the heat transfer system of the invention, to provide refrigeration for air conditioning or other purposes, is illustrated in FIG. 8. In that embodiment a pump 81 is provided for feeding the condensed ammonia solution or other working fluid into a cooling evaporator 82. A condenser 83, connected to the cooling evaporator by a vapor line 84, is further provided for absorption of the resulting ammonia vapor in the working fluid. The condenser is connected to solution tank 13 by a valved solution inlet line 85 and a solution outlet line 86.

In operation, ammonia condensate is removed from the receiver 14 and fed by pump 81 to the cooling evaporator 82, as indicated by arrow 87. In the cooling evaporator (which may be of any conventional design) the ammonia condensate is evaporated, thereby absorbing the heat of vaporization of the ammonia from the media to be cooled. The resulting ammonia vapor is fed to condenser 83, as indicated by arrow 88, where it is absorbed by the relatively low concentration ammonia solution removed from solution tank 13 through line 85, as indicated by arrow 89, and recycled to the solution tank through line 86, as shown at 91.

Use of the system depicted in FIG. 8 provides continuous cooling capability, though only intermittently charged by thermal transfer from evaporator 11, provided that thermal sink 15 possesses sufficient heat capacity. The system provides refrigeration capability below 32° F. Alternatively, when simple air conditioning is desired, sufficient cooling may be obtained employing cooling evaporator 82 without condenser 83 and its associated circuit, again provided sink 15 has sufficient thermal mass and conductivity.

It will be understood that various changes may be made in the several embodiments of the reversible heat transfer processes and systems described hereinabove without departing from the scope of the present invention. Thus, the evaporators and condensers may be of any conventional design, and in fact may be combined into a single dual function unit. In addition, the working fluid compositions, and the temperature, pressure and other conditions utilized may be chosen in accordance with the desired heat transfer characteristics for the particular application involved. Accordingly, it is intended that the preceding description is illustrative only, and that the scope of the invention solely be measured by the claims appended hereto.

What is claimed is:

1. A process for reversibly transferring heat between a plurality of zones maintained at different temperature levels, including evaporating a solution containing a volatile material in a first, heated evaporation zone, condensing vapor of the volatile material in a second, condensation zone at a temperature less than that of the evaporation zone, and removing heat from the condensation zone upon condensation of the volatile material vapor therein; comprising:

(a) maintaining the solution in a solution-holding zone;

(b) circulating the solution from the solution-holding zone through the evaporation and/or condensation zones;

(c) feeding the volatile material vapor from the evaporation zone into a separate receiving zone maintained at a lower temperature, and condensing the vapor therein;

(d) providing a low temperature thermal sink in heat exchange relation with the receiving zone;

(e) effecting heat transfer from the receiving zone to the thermal sink upon condensation of the volatile material vapor in the receiving zone;

(f) when it is desired to extract heat from the condensation zone, vaporizing the volatile material in the receiving zone and thereby effecting heat transfer from the thermal sink to the resulting vapor;

(g) feeding the vapor to said condensation zone and absorbing it in the solution therein; and (h) recovering the thermal energy released during step (g).

2. The process of claim 1, wherein said volatile material is a substance having a high vapor pressure and a high heat of vaporization, and wherein the solution incorporates a second material which is relatively non-volatile and co-stable with the volatile material under the normal operating conditions of the process.

3. The process of claim 2, wherein the solution comprises a solution of a non-volatile inorganic metal salt in ammonia.

4. A process for reversibly transferring heat between a plurality of zones maintained at different temperature levels, which comprises:

(a) maintaining a solution of a volatile material in a solution-holding zone;

(b) feeding the solution into an evaporation zone to evaporate said material;

(c) recycling the solution, having a decreased concentration of the volatile material, from the evaporation zone to the solution-holding zone;

(d) feeding the volatile material-containing vapor formed in the evaporation zone from said zone into a separate receiving zone, and condensing the vapor therein at a temperature lower than the temperature of said evaporation zone;

(e) providing a low temperature thermal sink in heat exchange relation with the receiving zone;

(f) effecting heat transfer from the receiving zone to the thermal sink upon condensation of the volatile material vapor in the receiving zone;

(g) continuously carrying out steps (a)–(f) to store thermal energy in said low temperature thermal sink;

(h) when it is desired to withdraw heat from the condensation zone, feeding the solution having a decreased concentration of the volatile material therein into the condensation zone and thereby decreasing the vapor pressure of the solution in said zone;

(i) absorbing volatile material vapor in the solution in the condensation zone responsive to the decreased vapor pressure therein;

(j) vaporizing volatile material in the receiving zone, and feeding the volatile material vapor into the condensation zone, to replace the vapor absorbed in step (i); and (k) recovering the thermal energy released from the low temperature thermal sink by vaporization of the volatile material in the receiving zone in step (j) and absorption of the volatile material vapor in the condensation zone in step (k).

5. The process of claim 4, wherein the heating and evaporation of the volatile material in step (b) is actuated by solar insolation.

6. The process of claim 4, wherein the evaporation zone is maintained at temperatures of from 80° to 250° F., the condensation zone is maintained at temperatures of from 80° to 120° F., and the receiving zone and the thermal sink are maintained at temperatures of from 30° to 80° F.

7. The process of claim 4, wherein said volatile material is a substance having a high vapor pressure and a high heat of vaporization, and wherein the solution incorporates a second material which is relatively non-volatile and co-stable with the volatile material under the normal operating conditions of the process.

8. The process of claim 7, wherein the solution comprises a solution of sodium thiocyanate in ammonia.

9. A heat transfer system including, in combination, an evaporator for a solution containing a volatile material, means for heating the evaporator to vaporize the volatile material, a condenser in which vapor of the volatile material is absorbed in the solution, and means for removing and recovering heat from the condenser upon absorption of the volatile material vapor; comprising:

(a) a least one solution tank communicating with both the evaporator and the condenser for storing the solution and circulating it through the evaporator and/or condenser;

(b) a receiver communicating with the evaporator and the condenser, for receiving the volatile material vapor from the evaporator and condensing the vapor, and for periodically vaporizing the volatile material from the resulting condensate and feeding the resulting vapor into the condenser; and (c) a low temperature thermal sink in heat exchange relation with the receiver for receiving heat from the receiver upon condensation of the volatile material therein, and for heating the solution in the receiver to vaporize volatile material to be fed into the condenser.

10. The heat transfer system of claim 9, wherein the evaporator is in heat exchange relation with said means for heating the evaporator but is otherwise insulated from its surroundings, the condenser is in heat exchange relation with said means for removing heat from the condenser but is otherwise insulated from its surroundings, and the receiver and solution tank are not insulated; and wherein the internal volume of the solution tank is at least five times the internal volume of either of the evaporator or condenser.

11. The heat transfer system as defined in claim 9, including
   (1) evaporator liquid inlet and outlet conduits extending from the solution tank to the evaporator for feeding a solution of the volatile material to the evaporator and for receiving a solution having a decreased concentration of the volatile material from the evaporator, respectively, said conduits being in heat exchange relation with each other but being insulated from their surroundings;
   (2) condenser liquid inlet and outlet conduits extending from the solution tank to the condenser for feeding a solution of the volatile material to the condenser and for receiving a solution having an increased concentration of the volatile material from the condenser, respectively, said conduits being in heat exchange relation with each other but being insulated from their surroundings; and
   (3) evaporator vapor outlet and condenser vapor inlet conduits extending from the evaporator to the receiver and from the receiver to the condenser for feeding the volatile material vapor from the evaporator into the receiver and for feeding volatile material vapor generated in the receiver to the condenser, respectively.

12. The heat transfer system as defined in claim 9, further comprising:
   (d) a first, dilute solution tank for feeding the solution to the evaporator;
   (e) a condenser liquid outlet conduit extending from the condenser to the dilute solution tank, and an evaporator liquid inlet conduit extending from the dilute solution tank to the evaporator;
   (f) a second, concentrated solution tank for feeding the solution having a decreased concentration of the volatile material therein from the evaporator to the condenser;
   (g) an evaporator liquid outlet conduit extending from the evaporator to the concentrated solution tank, and a condenser liquid inlet conduit extending from the concentrated solution tank to the condenser;
   (h) pressure generating means actuated by the temperature in the evaporator for actuating the feed of the solution from the dilute solution tank to the evaporator through the evaporator liquid inlet conduit; and
   (i) pressure generating means actuated by the temperature in the condenser liquid outlet conduit for actuating feed of the solution from the concentrated solution tank to the condenser through the condenser liquid inlet conduit.

13. A heat transfer system for the storage and recovery of solar energy which comprises, in combination:
   (a) an evaporator for receiving a solution containing a volatile material;
   (b) solar-energized heat input means for heating the evaporator to vaporize the volatile material therein;
   (c) a condenser for receiving volatile material vapor;
   (d) heat output means for recovering heat from the condenser upon condensation of volatile material vapor therein;
   (e) a receiver for receiving the volatile material vapor produced in the evaporator and condensing the vapor therein, and for periodically vaporizing the volatile material therein and feeding the resulting vapor into the condenser, thereby effecting reversible, non-degrading heat storage and recovery, the receiver communicating with the evaporator and the condenser by:
      (1) an evaporator vapor outlet conduit extending from the evaporator to the receiver for feeding the volatile material vapor from the evaporator into the receiver; and
      (2) a condenser vapor inlet conduit extending from the receiver to the condenser for feeding volatile material vapor formed in the receiver into the evaporator;
   (f) a solution tank for storing the solution and in communication wtih the evaporator and the condenser, the solution tank communicating with the evaporator and condenser by:
      (1) an evaporator liquid inlet conduit extending from the solution tank to the evaporator for feeding the solution to the evaporator;
      (2) an evaporator liquid outlet conduit extending from the evaporator to the solution tank for feeding the solution having a decreased concentration of the volatile material to the solution tank, said conduits being in heat exchange relation with one another but being otherwise insulated from their surroundings;
      (3) a condenser liquid inlet conduit extending from the solution tank to the condenser for feeding the solution to the condenser;
      (4) a condenser liquid outlet conduit extending from the condenser to the solution tank for feeding the solution having an increased concentration of the volatile material to the solution tank, said conduits being in heat exchange relation with one another but being otherwise insulated from their surroundings; and
   (g) a thermal sink in heat exchange relation with the receiver for receiving heat from the receiver upon condensation of the volatile material therein, and for transferring heat to the condensate in the receiver to vaporize the volatile material to be fed into the condenser.

14. The heat transfer system of claim 13, wherein the evaporator is in heat exchange relation with said input means for heating the evaporator but is otherwise insulated from its surroundings, the condenser is in heat exchange relation with said output means for removing heat from the condenser but is otherwise insulated from its surroundings, and the solution tank is not insulated; and wherein the internal volume of the solution tank is at least five times the internal volume of either of the evaporator or condenser.

15. The system as defined in claim 13, wherein the evaporator vapor outlet and condenser vapor inlet conduits are partially insulated from their surroundings, said conduits having a common branch a portion of which is not insulated and which is in heat exchange relation with the solution tank.

16. The heat transfer system as defined in claim 13, wherein the solution incorporates as said volatile material a substance having a high vapor pressure and a high heat of vaporization, and wherein the solution incorporates a second substance which is relatively non-volatile and co-stable with the first, volatile substance under the normal operating conditions at which the system is employed.

17. The heat transfer system as defined in claim 16, wherein the solution comprises a solution of a non-volatile inorganic salt in ammonia.

18. The heat transfer system as defined in claim 13, further comprising:
   (h) a secondary thermal sink at a temperature at least 40° F. colder than said thermal sink (g);
   (i) a low temperature condenser in heat exchange relation with said secondary thermal sink; and
   (j) conduit means for connecting the low temperature condenser to the solution tank, and to the receiver, for removing volatile material vapor from the solution tank and for feeding condensate thereof to the receiver.

19. The heat transfer system as defined in claim 13, including a cooling evaporator, and means connecting the cooling evaporator to the receiver, and to the solution tank, for feeding the solution from the receiver through the cooling evaporator, for evaporating the solution and thereby absorbing the heat of vaporization of the volatile material in the cooling evaporator, and for feeding the resulting volatile material vapor to the solution tank.

20. The heat transfer system as defined in claim 9, further comprising:
   a secondary thermal sink maintained at a temperature of at least 40° colder than said thermal sink;
   a low temperature condenser in heat exchange relation with said secondary thermal sink; and
   conduit means for connecting the low temperature condenser to the solution sink, and to the receiver, for removing volatile material vapor from the solution tank and for feeding condensate thereof to the receiver.

21. The heat transfer system as defined in claim 9, including a cooling evaporator, and means connecting the cooling evaporator to the receiver, and to the solution tank, for feeding the solution from the receiver through the cooling evaporator, for evaporating the solution and thereby absorbing the heat of vaporization of the volatile material in the cooling evaporator, and for feeding the resulting volatile material vapor to the solution tank.

* * * * *